United States Patent
Hulick, Jr.

(10) Patent No.: US 11,553,001 B2
(45) Date of Patent: Jan. 10, 2023

(54) END USER SECURITY MANAGER

(71) Applicant: Cisco Technology, Inc., San Jose, CA (US)

(72) Inventor: Walter Theodore Hulick, Jr., Pearland, TX (US)

(73) Assignee: Cisco Technology, Inc., San Jose, CA (US)

(*) Notice: Subject to any disclaimer, the term of this patent is extended or adjusted under 35 U.S.C. 154(b) by 179 days.

(21) Appl. No.: 16/787,552

(22) Filed: Feb. 11, 2020

(65) Prior Publication Data
US 2021/0250376 A1    Aug. 12, 2021

(51) Int. Cl.
    H04L 9/40      (2022.01)
    G06F 9/445     (2018.01)
    H04L 67/51     (2022.01)

(52) U.S. Cl.
    CPC .......... H04L 63/20 (2013.01); G06F 9/44526 (2013.01); H04L 63/10 (2013.01); H04L 63/166 (2013.01); H04L 67/51 (2022.05)

(58) Field of Classification Search
    CPC ....... H04L 63/20; H04L 63/10; H04L 63/166; H04L 67/16; G06F 9/44526
    See application file for complete search history.

(56) References Cited

U.S. PATENT DOCUMENTS

| | | | |
|---|---|---|---|
| 9,055,048 B2 | 6/2015 | Shepherd et al. | |
| 10,289,857 B1 | 5/2019 | Brinskelle | |
| 10,318,732 B2 | 6/2019 | MacDermid | |
| 2008/0155013 A1 | 6/2008 | Morris | |
| 2015/0047051 A1* | 2/2015 | Johns | H04W 12/08 726/27 |
| 2016/0381061 A1 | 12/2016 | Vanunu et al. | |

FOREIGN PATENT DOCUMENTS

| | | | |
|---|---|---|---|
| CN | 110708278 A | | 1/2020 |
| JP | 4924269 B2 | * | 4/2012 |

OTHER PUBLICATIONS

Brian Jackson, Hardening Your HTTP Security Headers, Jun. 19, 2019, https://www.keycdn.com/blog/http-security-headers, (Year: 2019).*
Buchanan et al., Analysis of the Adoption of Security Headers in HTTP, Article in IET Information Security, Oct. 2017, DOI: 10.1049/iet¬ifs.2016.0621, (Year: 2017).*
Chen et al. (Longitudinal Study of the Use of Client-side Security Mechanisms on the European Web, WWW'16 Companion, Apr. 11-15, 2016, Montreal, Quebec, Canada (Year: 2016).*

(Continued)

*Primary Examiner* — Matthew Smithers
*Assistant Examiner* — Shu Chun Gao
(74) *Attorney, Agent, or Firm* — Behmke Innovation Group LLC; James M. Behmke; Jonathon P. Western

(57) ABSTRACT

In one embodiment, a client device accesses an online application via a browser executed by the client device. The client device makes an assessment as to whether the online application uses Hypertext Transfer Protocol (HTTP) security headers that satisfy a security header policy. The client device generates scoring for the webpage based on the assessment. The client device presents the generated scoring to a user of the client device.

20 Claims, 16 Drawing Sheets

(56) References Cited

OTHER PUBLICATIONS

Betts, Andrew, "The Headers We Want", online: https://www.fastly.com/blog/headers-we-want, May 2018, 9 pages, Fastly, Inc.

Helme, Scott, "Scoring Transparency for Securityheaders.io", online: https://scotthelme.co.uk/scoring-transparency-on-securityheaders-io/, Jan. 2016, 9 pages.

Jackson, Brian, "Hardening Your HTTP Security Headers", online: https://www.keycdn.com/blog/http-security-headers, Jun. 2019, 8 pages, keycdn.

Kumar, Chandan, "How to Enable Secure HTTP Header in Apache Tomcat8?", online: https://geekflare.com/tomcat-http-security-header/, Jan. 2020, 6 pages, GeekFlare.com.

Maes, et al., "Browser Protection Against Cross-Site Request Forgery", SecuCode'09, Nov. 2009, 8 pages, Chicago, Illinois.

OWASP Secure Headers, online: https://owasp.org/www-project-secure-headers/, printed Feb. 2020, 27 pages, owasp.org.

Thakkar, Jay, "HTTP Security Headers: 5 Headers You Must Implement on Your Site", online: https://www.thesslstore.com/blog/http-security-headers/, Apr. 2018, 8 pages, HashedOut.

Buchanan, William J., "Analysis of the Adoption of Security Headers in HTTP", IET Information Security, the Institution of Engineering and Technology, Michael Faraday House, vol. 12, No. 2, Mar. 1, 2018, pp. 118-126.

International Search Report dated Apr. 20, 2021 in connection with European Patent Application No. PCT/US2021/015661.

\* cited by examiner

| Sat Jun 08 14:34:03 CDT 2019 | http://www.gm.com/ | 42 | 0 | 0 | Failed - no headers on the first page |

FIG. 6

| | | | | | |
|---|---|---|---|---|---|
| Sat Jun 08 14:39:48 CDT 2019 | http://www.equifax.com/ | 99 | 0 | 0 | Excellent - pct of all headers: 163 | Header 1: x-frame-options=SAMEORIGIN<br>Header 2: x-xss-protection=1; mode=block<br>Header 3: x-content-type-options=nosnif |

| | | | | |
|---|---|---|---|---|
| End User Security Manager (EUSM) | | ▲ | | |
| Update Policy | | | | |
| ✓ Show Popup for Security Header Usage | | | | |
| ✓ Send Event to Manager with Security Header Usage | | | | |
| ✓ Apply Security Headers from Policy | | | | |
| | | This Can Read and Change Site Data | | |
| | | Options | | |
| | | Remove from Chrome... | | |
| | | Hide in Chrome Menu | | |
| | | Manage Extensions | | |
| | | Inspect Popup | | |

| Time | URL | Requests Http Requests | No Http Only Cookie | No Secure Cookie | Score | First Page Headers | x-content-type-options | x-permitted-cross-domain-policies | referrer-policy | x-frame-options | strict-transport-security | content-security-policy | x-xss-protect |
|---|---|---|---|---|---|---|---|---|---|---|---|---|---|
| Sat Jun 08 15:02:38 CDT 2019 | http:// www. foocorp. foo | 03 0 | 0 | 0 | Excellent - pct of all headers: 191 | Header 1: strict-transport-security=max-age=2592000 Header 2: x-content-type-options= nosniff Header 3: x-xss-protection=1; mode=block Header 4: x-frame-options= sameorigin Header 5: content-security-policy=default-src 'none'; base-uri ... | 42 | 0 | 0 | 35 | 39 | 40 | 41 |

FIG. 12

END USER SECURITY MANAGER

TECHNICAL FIELD

The present disclosure relates generally to computer systems, and, more particularly, to an end user security manager.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In addition, even in this day and age of cybersecurity breaches—there are still websites that use HTTP (clear text) and allow JavaScript access to local cookies as well cookies related to sessions are transmitted over HTTP. In every case, this is due to how the application is designed—poor security at the application essentially results in security breaches for its end users who are at the mercy of the application vendor's security. The lack of security in the application eventually manifests itself in the end user's browser.

To combat this, there have been numerous advances in security options for the end user to circumvent the liability from the application. These are in the form of HTTP headers transmitted in the application response. Sadly, many of the applications today still don't use these headers—leaving end users exposed to security breaches. By simply including these headers—the application could dramatically reduce the exposure that its end users have to security breaches.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5-6 illustrate example screen captures of an EUSM system evaluating a first website;

FIGS. 7-8 illustrate example screen captures of an EUSM system evaluating a second website;

FIG. 9 illustrates an example screen capture of a configuration menu for an EUSM system;

FIG. 12 illustrates an example screen capture of an event panel for an EUSM system.

DESCRIPTION OF EXAMPLE EMBODIMENTS

Overview

Figure 1A:
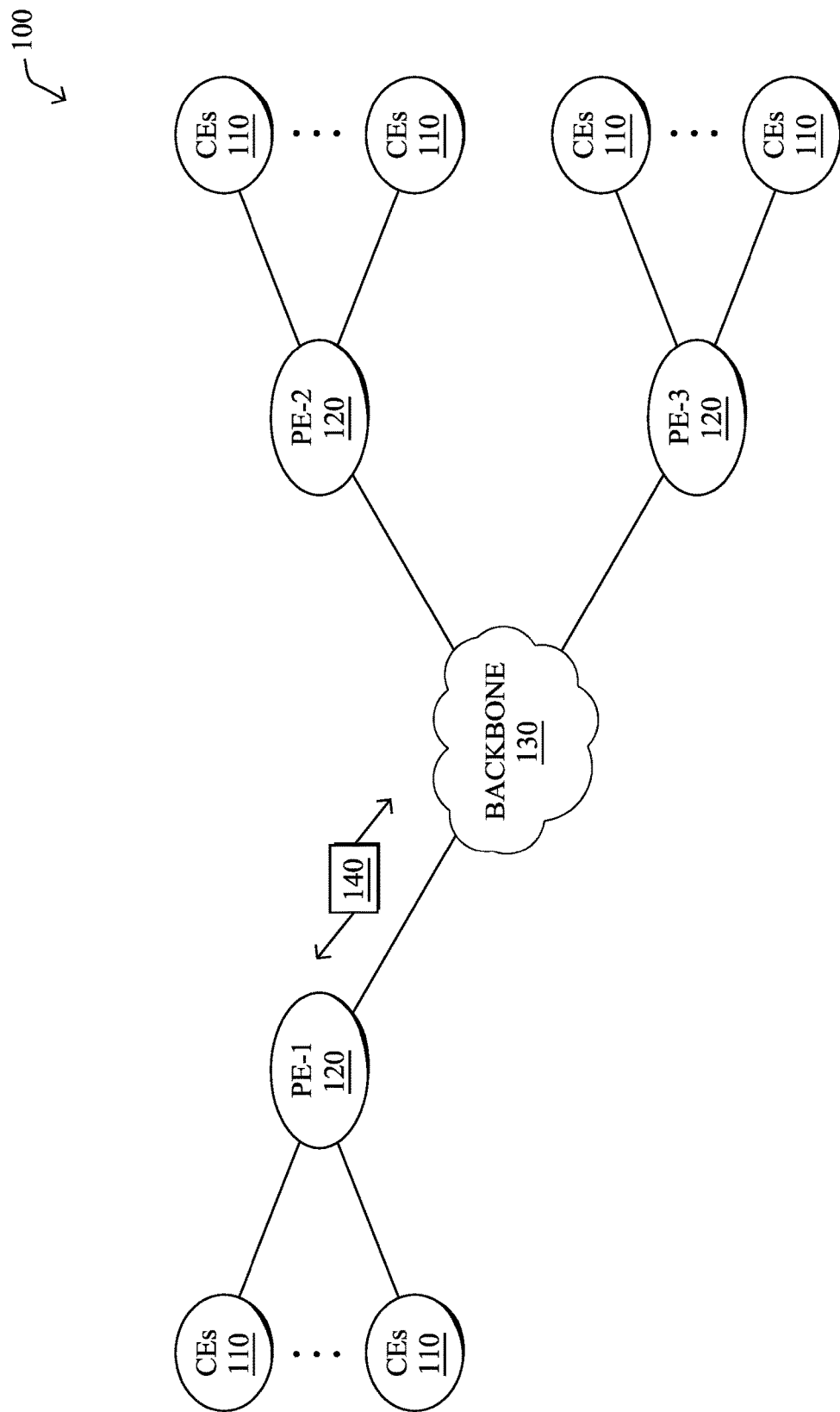
FIGS. 1A-1B illustrate an example computer network.

According to one or more embodiments of the disclosure, a client device accesses an online application via a browser executed by the client device. The client device makes an assessment as to whether the online application uses Hypertext Transfer Protocol (HTTP) security headers that satisfy a security header policy. The client device generates scoring for the webpage based on the assessment. The client device presents the generated scoring to a user of the client device.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
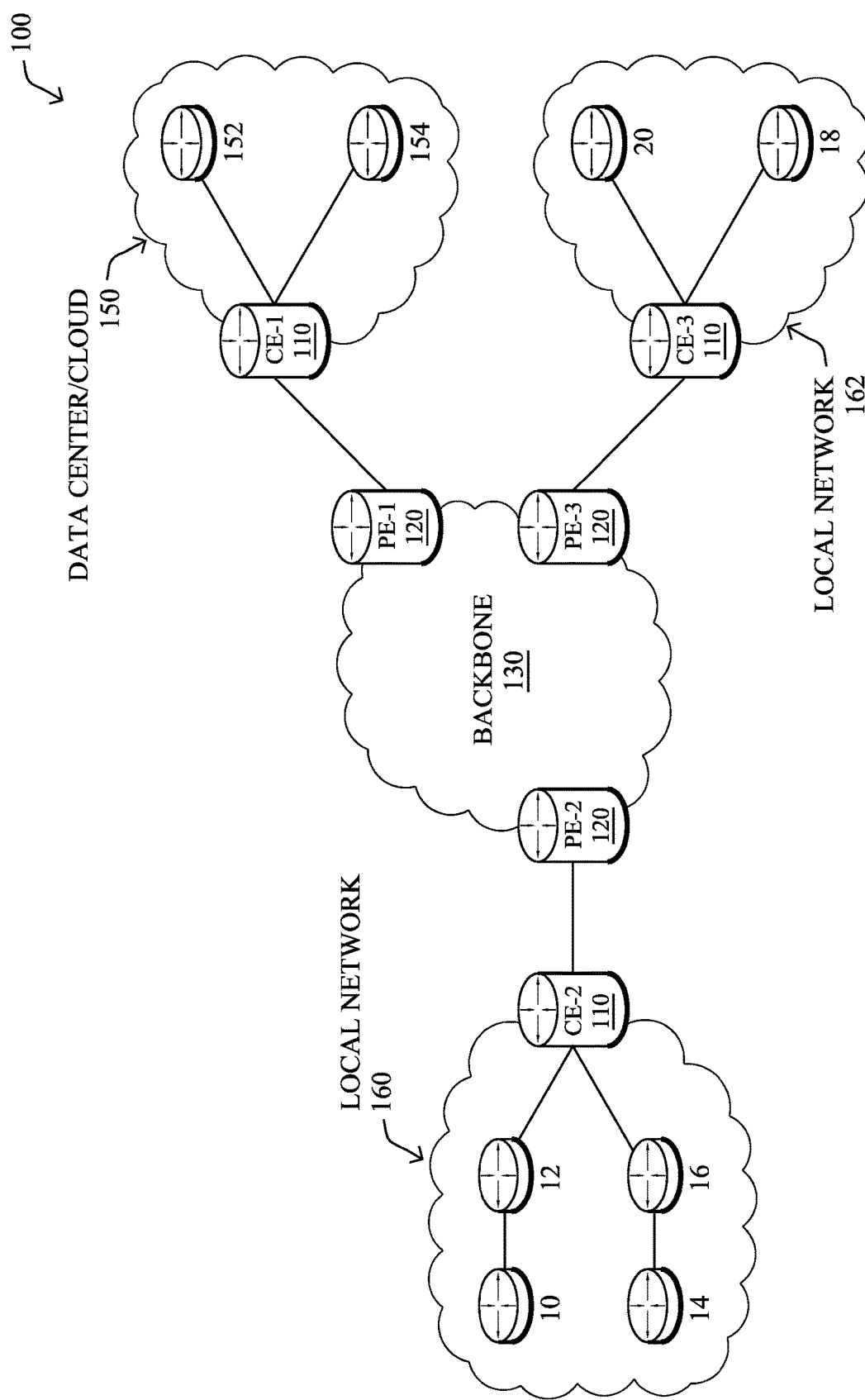

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
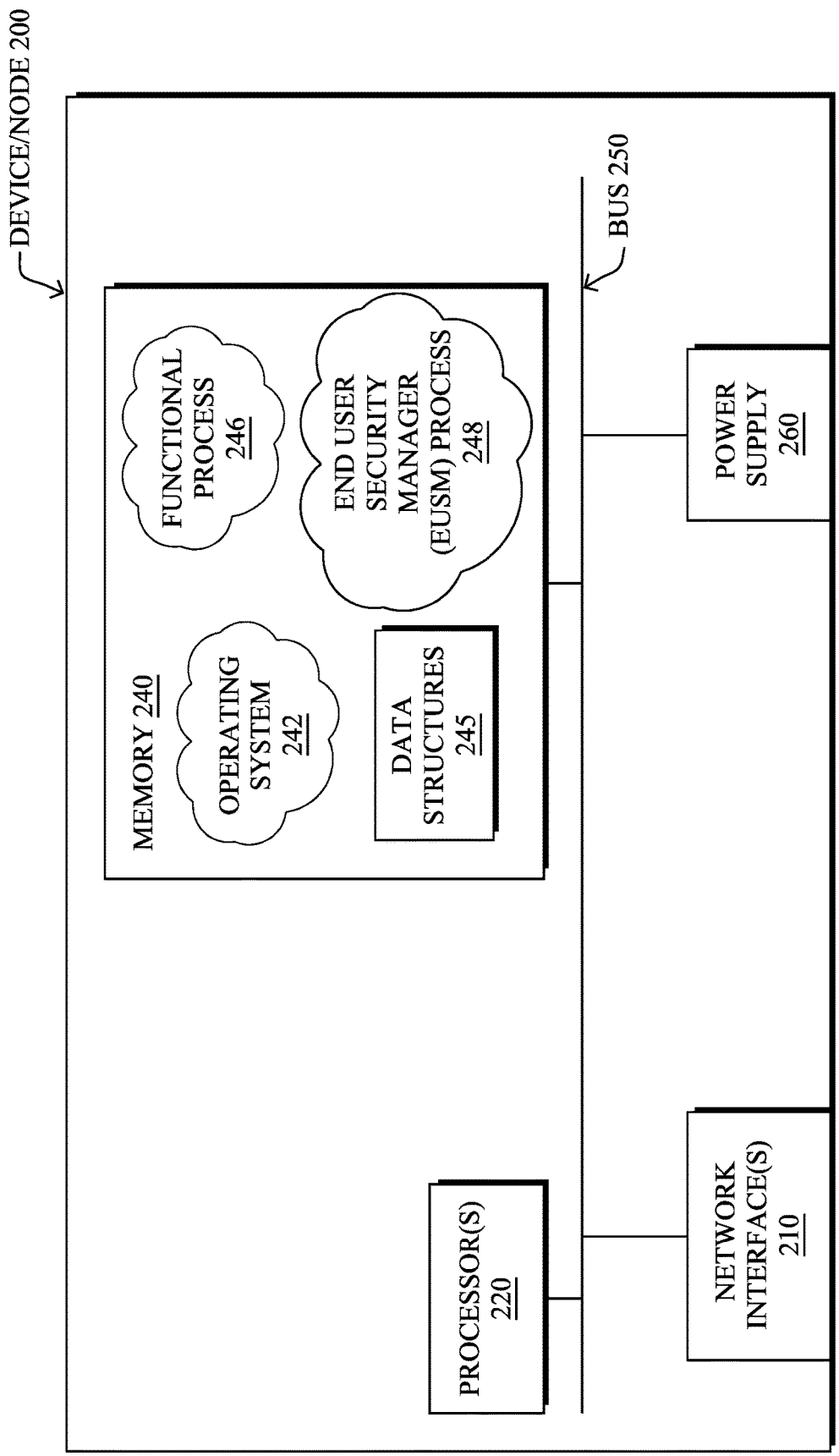
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative end user security manager (EUSM) process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As used herein, the term "online application" generally refers to any application that is executed fully or partially by a remote device and accessed by a client device. In many instances, an online application takes the form of an application webpage that is accessed by a web browser executed by the client device. However, in further cases, the online application may also be accessed by a more specialized process of the client device. For example, a user of the client device may conduct a transaction with a retail vendor via a website of the vendor or, alternatively, may conduct the transaction via a mobile app. specifically associated with that vendor. In such cases, the specialized app. on the client device can also be viewed as a browser that is limited in which online application(s) it can access.

As noted above, there have been numerous security breaches that have taken place via a user's browser. For example, Cross Site Scripting (XSS) and Cross Site Request Forgery (CSRF) have resulted in user sessions being hijacked to perform actions on behalf of the user without their knowledge. According to a leading security vulnerability database, there have been nearly 10,000 major XSS attacks recorded since 2009. After distributed denial of service (DDoS) and code execution attacks, XSS attacks are very common.

In addition, even in this day and age of cybersecurity breaches, there are still websites and other online applications that use Hypertext Transfer Protocol (HTTP) for their transfer protocol, allow JavaScript access to local cookies on the client device, and/or transmit session cookies over HTTP. In each case, this is due to how the application/webpage is designed. In other words, poor security practices at the online application can result in security breaches for its users.

To address the above security concerns, there have been a number of advances in security options that the provider of an online application can implement. These are in the form of HTTP headers transmitted in the application response. Unfortunately, many of the online applications today still do not use these headers, leaving client devices exposed to potential security breaches. By simply including these headers, the online application could dramatically reduce the exposure that its end users have to security breaches. In essence, the end user is at the mercy of the application's security implementation.

Also, there are two flags that should always be on every cookie (via the Set-Cookie header) which will secure session cookies by specifying that the browser never transmit the cookie over HTTP and that the cookie not be available via document.cookie. As would be appreciated, a session cookie is what is used to 'match' the user to the application session and should be guarded using these headers.

Current solutions today involve security headers that are mainly controlled by application site via the following methods:
  The development team implementing use of the security headers;
  Some application servers allow for the use of security headers via configuration; or
  Nginx or Apache allow for header insertion as part of a proxy or load balance.

In all of the above approaches, the end user is still relying on the provider of the online application to take action, which is frequently not the case. Indeed, it is estimated that 90% of the top 1,000,000 websites on the Internet are scored at an "F" rating for use of these HTTP security headers (i.e., they get a failing grade due to failure to simply enable the security built into the browser).

To date, a user can never be completely sure whether their browser is using HTTP security headers with any given application webpage, as even the most popular web browsers cannot not enforce this. In fact, users can only ask the web browser's developers to add specific headers.

Generally, the most common HTTP security headers and protections include those listed below. As would be appreciated, those listed below are for purposes of illustration and that other security headers also exist and/or may be added over time.

Content-Security-Policy (CSP): Use of this header effectively acts like a firewall in the browser. If the website is compromised, use of this header helps to limit the damage by preventing connections to unapproved hosts. From a security standpoint, use of this header is considered essential.
  Referrer-Policy: Use of this header configures the level of detail to include in the Referrer header when navigating away from the webpage, to help prevent data from leaking to any other websites linked to the application webpage. From a security standpoint, use of this header is considered highly recommended.
  Strict-Transport-Security: Use of this header prevents any attempt to connect to the application website over plain HTTP. Doing so is also highly recommended, as this can help to stop man-in-the-middle attacks.
  X-XSS-Protection: Use of this header prevents some forms of cross site scripting attacks by preventing script from executing if any of the markup in the document is also present in the same form in the request. For example, if the webpage is loaded with url /index.html?foo=<script>alert('foo');</script> and the browser sees <script>alert('foo');</script> in the page source, the script is blocked. In general, this header has been made largely redundant by the CSP header.
  X-Content-Type-Options: When this header is used and set to 'nosniff,' the browser is prevented from allowing content that looks like JavaScript from executing, even if it doesn't have the right content-type. Doing so helps to prevent mime confusion attacks and, more recently, is being used by the Chrome browser to enable site isolation. Use of this header is becoming less necessary over time, due to better default behaviors, but doing so is still considered to be a best practice.
  Cross-Origin Resource Sharing (CORS): These headers allow a uniform resource locator (URL) to be loaded by script operating on another origin. From a security standpoint, use of CORS headers is considered optional. However, these headers are permissive, not restrictive, so their use can still provide the highest degree of security possible.

Further HTTP headers that should be used are more performance-related in nature, but can also be included in the set of security headers for purposes of the techniques introduced herein. For example, use of the following headers is also recommended:
  Timing-Allow-Origin: Use of this header allows monitoring tools access to timing data for the request. Since this results in a richer dataset for analytics services, this is recommended for a large majority of webpages.
  Link rel=preload: Use of this header notifies the browser of critical resources that it should start downloading, even if the browser has yet to encounter a need for them. For example, this can improve performance by causing the browser to preload fonts, important CSS, and the like.

Server-Timing: Use of this header provides server-side timing information to the browser, which allows navigation and resource timing application programming interfaces (APIs) to be supplemented with more granular information about individual tasks that make up the server side processing (e.g., 'how long did we spend in MySQL'). This is particularly useful for monitoring performance data in conjunction with real user monitoring (RUM) beacon tools.

—End User Security Manager—

The techniques herein introduce an effective, flexible, and 'zero friction' mechanism that can be used by an end user to circumvent the failings of online application providers, to leverage the use of client side security headers. In some aspects, the techniques herein are directed to an end user security management (EUSM) system which can be used to greatly enhance the end user's security with minimum setup and effort by enabling/leveraging the security header capabilities already built into the browser, such as by scoring an online application, patching any missing headers that should be used, etc.

Illustratively, the techniques described herein may be performed by hardware, software, and/or firmware, such as in accordance with the illustrative EUSM process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

Specifically, a client device accesses an online application via a network. The client device makes an assessment as to whether the online application uses Hypertext Transfer Protocol (HTTP) security headers that satisfy a security header policy. The client device generates scoring for the online application based on the assessment. The client device presents the generated scoring to a user of the client device.

Notably, the techniques herein need not create security enforcement, but instead leverage enforcement already built into many web browsers and enable that enforcement to be applied across an enterprise with minimal effort to the end user. In particular, the techniques herein are illustratively a cloud-based solution that allows any user or even a corporation to create a "Security Header policy" on a cloud-based server that would be distributed to the users' browser extension to automatically secure the browser using the latest security headers created for the browser, in some embodiments. So, no matter what the application vendor does on their end, it won't matter as the security headers based on the level of security selected (via the policy) will be applied to every response from any application vendor before the browser itself processes the response.

In some embodiments, the techniques here may add a "scorecard" that can be maintained and used to publish with users and online application providers around the world, to encourage them to improve their application security by implementing the right security headers. This information could even be sold to these sites to outline where their security is and to also show them how they compare with their competitors.

Figure 3:
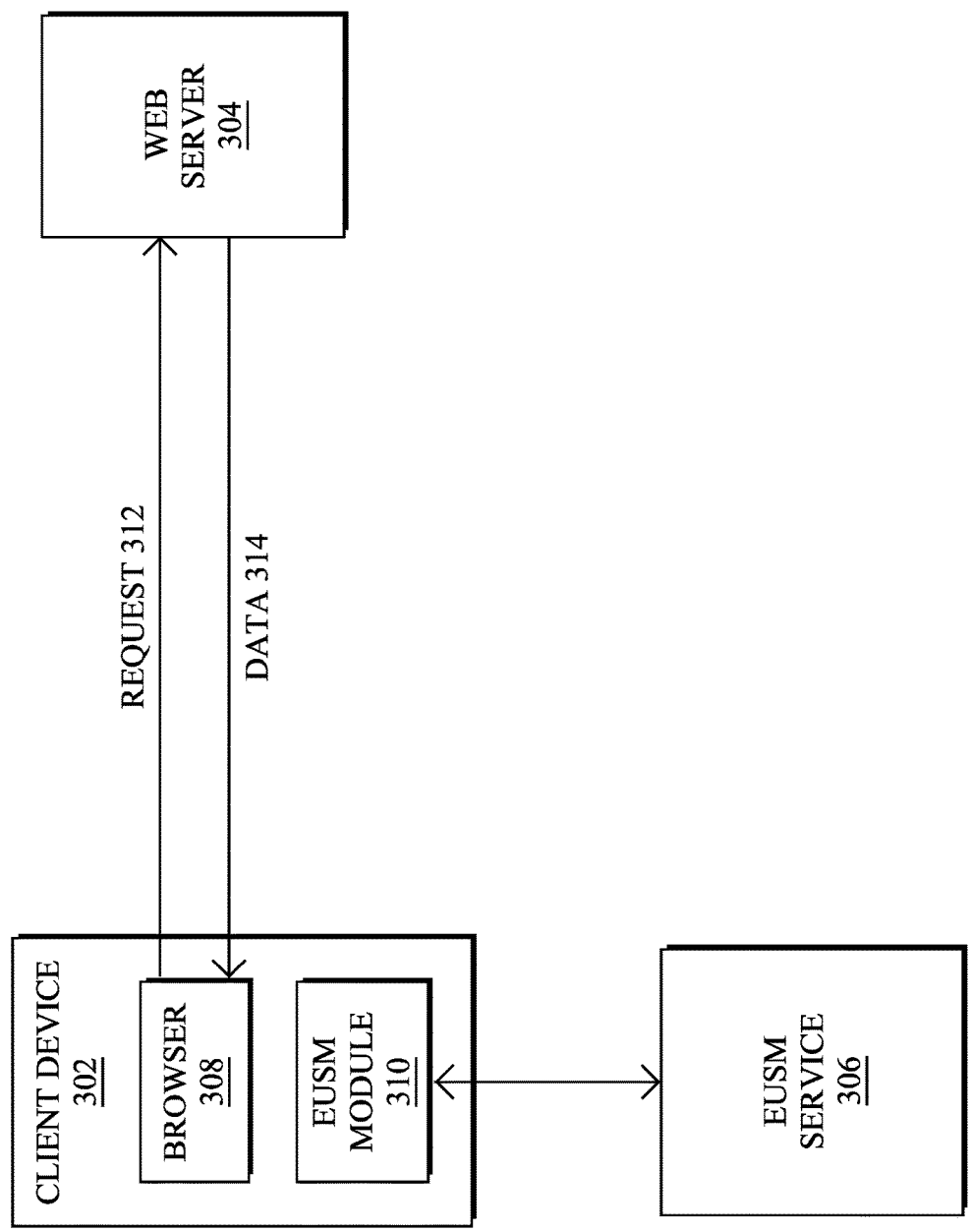
FIG. 3 illustrates an example architecture for an end user security management (EUSM) system.

Operationally, FIG. 3 illustrates an example architecture 300 for an end user security management/manager (EUSM) system, according to various embodiments. In many cases, the EUSM functionality is expected to be implemented as a "hybrid" cloud and client solution that work together to keep a user's browser secure by making sure that the browser always has the appropriate security headers added to the application response, based on the user's selected policy. However, further embodiments provide for the components of architecture 300 to be implemented fully on a client device, on an intermediary networking device or service (e.g., a router, a switch, a firewall, etc.), or fully in the cloud.

As shown, architecture 300 may generally include a client device 302 (e.g., a personal computer, a cellular phone, a tablet, etc.) and a web server 304 that is communicatively coupled to client device 302 via one or more communication networks. In various embodiments, client device 302 may also be in communication with an EUSM service 306 via one or more communication networks.

During operation, client device 302 may execute a browser 308, to interact with web server 304. For example, browser 308 may take the form of Internet Explorer™ Firefox™, Safari™, Chrome™ or other Chromium™-based browser, Opera™, or the like. In further embodiments, browser 308 may take the form of a more limited/restricted executable on client device 302, such as a mobile app. or other form of browser configured to access only certain online application(s). In addition, client device 302 may execute EUSM module 310 which may take the form of a downloadable browser extension for browser 308, in a preferred embodiment. In further embodiments, EUSM module 310 may take the form of a separate agent that operates in conjunction with browser 308 or its functionality integrated directly into browser 308. In yet another embodiment, EUSM module 310 may run as a Tomcat web application.

In various embodiments, EUSM service 306 may be deployed as a cloud service or, alternatively, as an on-premise ("on prem") service. For example, EUSM service 306 may be built using Java 8+ and may utilize port 8088 or the like. Thus, in cases in which EUSM module 310 is implemented as a browser extension, browser 308 may download and install EUSM module 310 from EUSM service 306. In further embodiments, EUSM service 306 may also be configured to maintain one or more EUSM policies for EUSM module 310. For example, the user of client device 302 may specify to EUSM service 306 the policy types/parameters that they wish EUSM module 310 to enforce.

According to the techniques herein, and as described further below, when the user of client device 302 operates browser 308 to access an online application served by web server 304, EUSM module 310 may review all components related to the requested application page to see whether it is qualified to instrument based on include/exclude site rules in the EUSM policy. More specifically, as shown, web server 304 may return webpage data 310 to browser 308 in response to request 312 issued by browser 308. In turn, EUSM module 310 may assess an EUSM policy maintained by EUSM service 306 (or locally via EUSM module 310), to determine whether data 314 is qualified for instrumentation.

If data 314 is qualified for instrumentation by policy, EUSM module 310 may perform any or all of the following actions:

Review all security headers used for data 314 for compliance with the EUSM policy;

Add any additional headers to data 314 that are missing, in accordance with the EUSM policy selected by the user of client device 302;

Generate a scoring for the online application served by web server 304, based on how well it complies with the EUSM policy;

Provide scoring information to EUSM service 306 as analytics to be used in tracking online application compliance. In some implementations, this functionality may be configurable by the user of client device 302 (or an administrator for client device 302) via EUSM module 310.

In some embodiments, EUSM module 310 may provide an indication of the scoring of the online application served by web server 304 to the user of client device 302 (e.g., via a display of client device 302, etc.). For example, EUSM module 310 may provide an indication of the scoring of the online application served by web server 304 in conjunction with the data 314 via browser 308. For instance, the user of client device 302 may be shown a popup bar chart of the "score" after the page has loaded using the toolbar icon for the extension.

In greater detail, the illustrative EUSM service 306 may be a security service to which the user of client device 302 can subscribe and receive updates according to the type of EUSM policy that they select. Once the subscription starts, browser 308 will automatically have the right security headers inserted into any received webpage data, to make the right security policy that the end user selects. In addition, the users that subscribe to EUSM service 306 may send valuable metrics back to EUSM service 306, allowing service 306 to track the compliance of online application providers in their usage of these security headers.

EUSM policy configuration (e.g., EUSM.properties file) may take the form of a single configuration file that configures the server policies, where the headerbase properties indicate the security headers check for in any received webpage data. Such policies essentially "extend" the header base to add security headers that need to be set.

An illustrative format for creating an EUSM policy is:
header.policy.headername=setting
where:
header—fixed "header";
policy—policy name;
headername—the security header name; and
setting—the setting for that security header to add/modify.

For instance, one EUSM policy may be defined as follows:
Base
headerbase.X-XSS-Protection=
headerbase.Strict-Transport-Security=
headerbase.X-Frame-Options=
headerbase.X-Content-Type-Options=
headerbase.Content-Security-Policy=;
headerbase.X-Permitted-Cros s-Domain-Policies=
headerbase.Referrer-Policy=
Default
header.default.X-XSS-Protection=1; mode=block
Multiple groups—let the Extension request the group to use Note that the users may specify the policy name to use from the extension, and any changes to the configuration file will force an update on the server.

A prototype EUSM system was constructed, in accordance with the teachings herein. FIGS. 4A-12 illustrate various screen captures from this prototype system, to better illustrate the functions of the EUSM system.

Figure 4A:
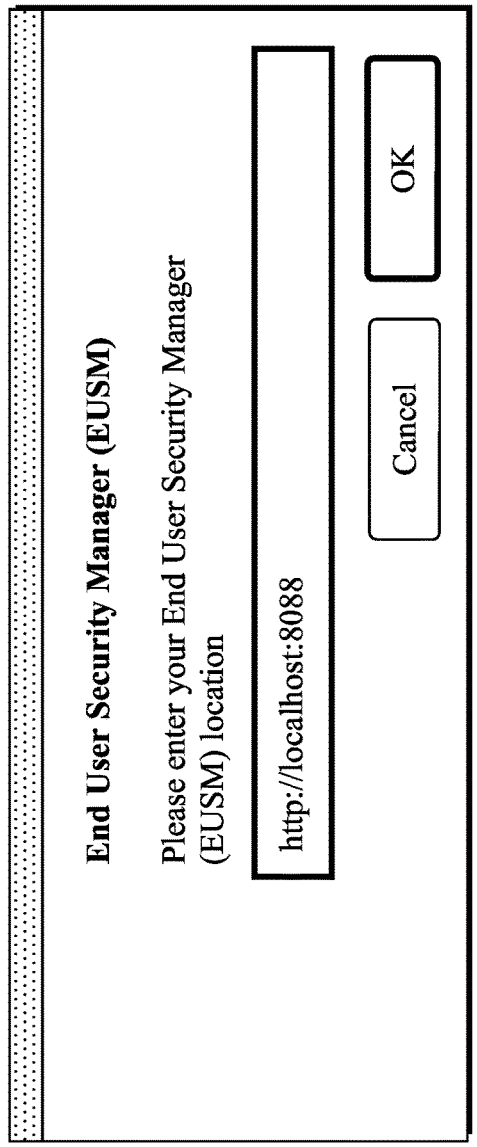
FIGS. 4A-4C illustrate example screen captures of security policy configuration for an EUSM system.
Figure 4B:
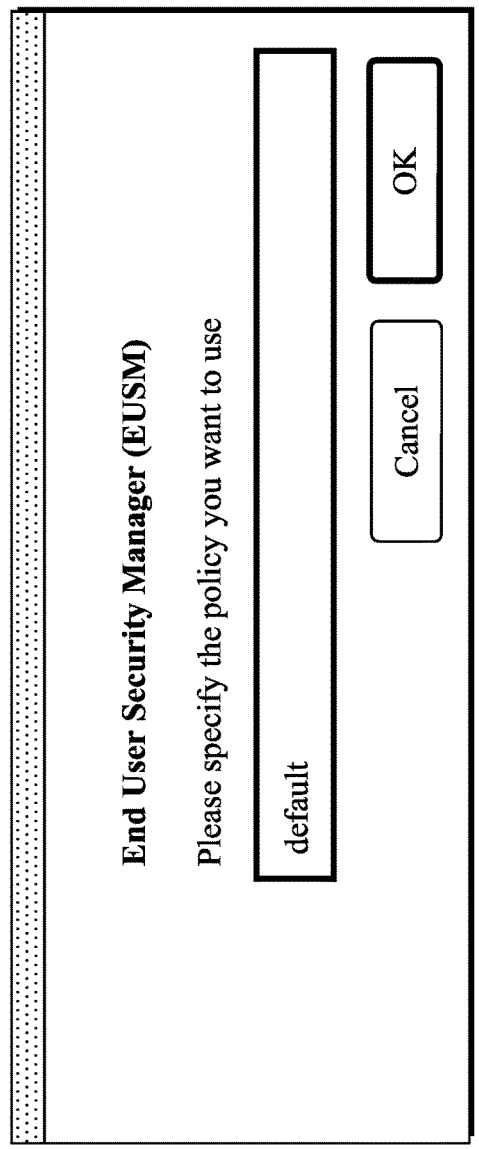
Figure 4C:
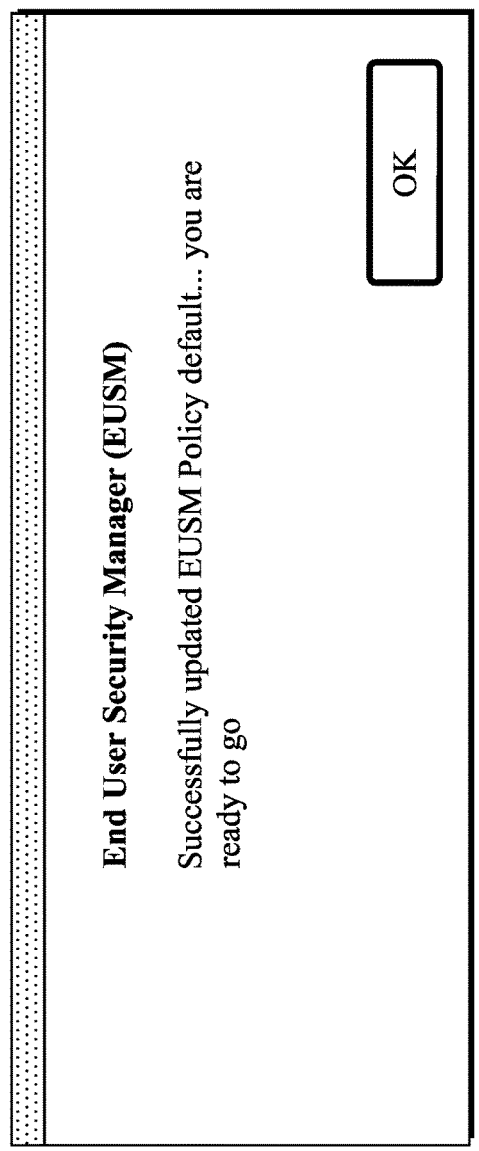

Regarding configuration of the EUSM module, once it is installed, the user of the client device may perform a short configuration, as shown in screen captures 400-420 in FIGS. 4A-4C. More specifically, this initial configuration may entail the following:

Step 1 (FIG. 4A)—Identify the EUSM Server;
Step 2 (FIG. 4B)—Select the EUSM policy to enforce; and
Step 3 (FIG. 4C)—Confirmation.

Figure 5:
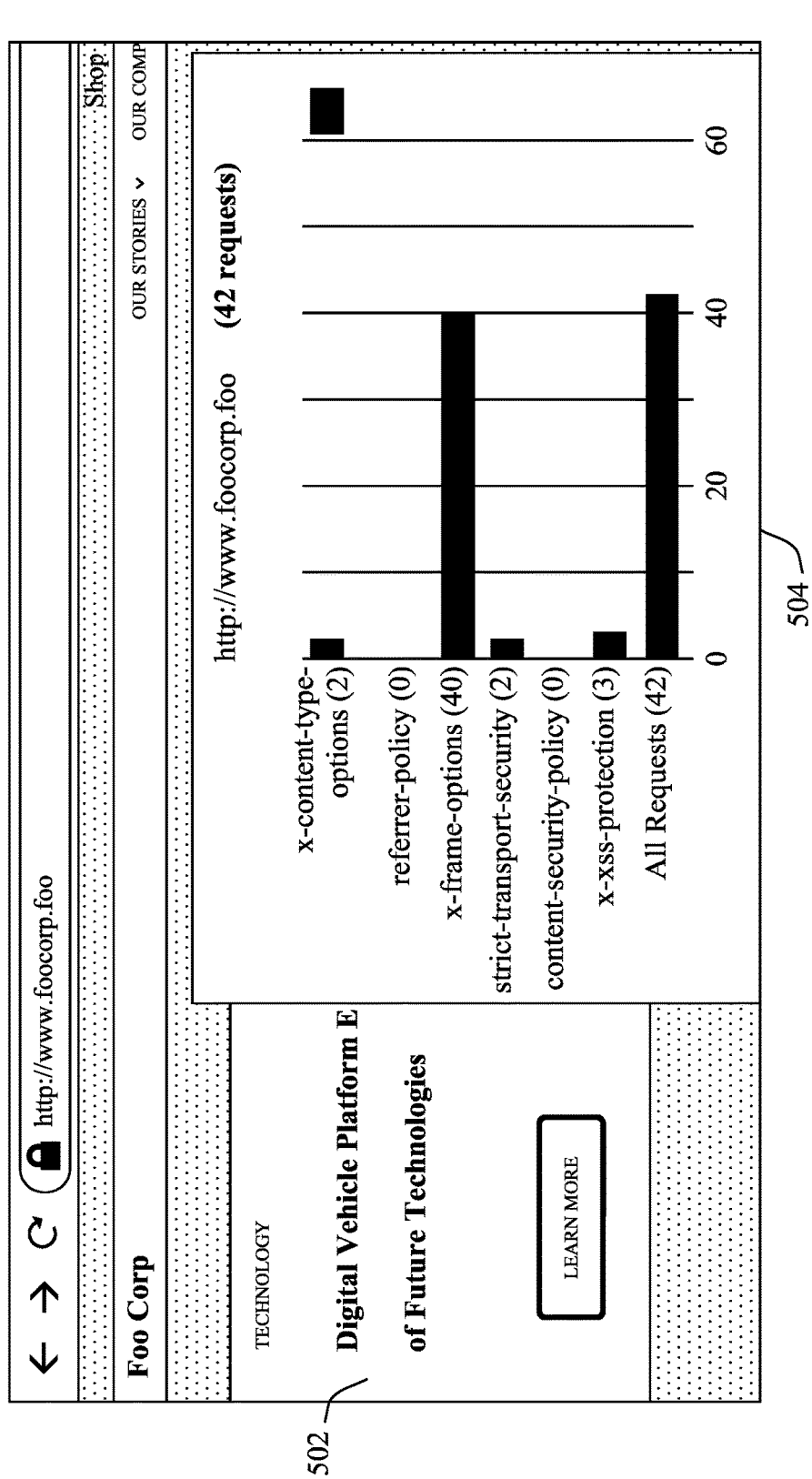

FIGS. 5-12 illustrate the operation of the EUSM system, once an EUSM policy has been configured. More specifically, FIG. 5 illustrates an example screen capture 500 of a browser loading a first application webpage 502, which has been anonymized for purposes of illustrating the techniques herein. Based on the assessment by the EUSM module as to whether website 502 complied with the specified EUSM policy, the EUSM module may generate a scoring for website 502 and present the generated scoring 504 in conjunction with website 502. More specifically, as shown, scoring 504 may take the form of a popup or other user interface object that indicates the compliance of website 502 with the EUSM policy.

From scoring 504, it can be seen that forty-two requests were made and that website 502 makes significant use of the x-frame-options header, indicating that the developers of website 502 are likely concerned about iFrame security. However, website 502 also does not make much use of the other security headers included in the specified EUSM policy, as shown in scoring 504.

As shown in screen capture 600 in FIG. 6, the EUSM module may also assign a failing score to website 502, based on its compliance with the EUSM policy. More specifically, the overall grading for website 502 was accessible in the prototype system via https://localhost:8088/EUSM?events. In this case, since the first page of website 502 did not use a single security header listed in the EUSM policy, the EUSM module may assign website 502 a failing score, based on the fact that there is not a single security header on its first page.

In various embodiments, the EUSM module assign a failing score/grade to a website under any or all of the following conditions, which may also be user-configurable:
No Headers on the first page;
Use of HTTP;
Not securing the Cookie;
Percent of headers very, very low;
Etc.

All non-failing scores may be judged based on the percentage of headers to request ratio, in some embodiments. Note also that there may be many additional techniques for scoring that would be more accurate and that those shown herein are merely illustrative for an example embodiment.

Although website 502 is considered to have failed the EUSM policy assessment, the EUSM module may nonetheless "patch" the website by inserting the missing headers defined in the EUSM policy into the data for website 502. Doing so means that the browser rendering website 502 will implement the security functions associated with these headers.

Figure 7:
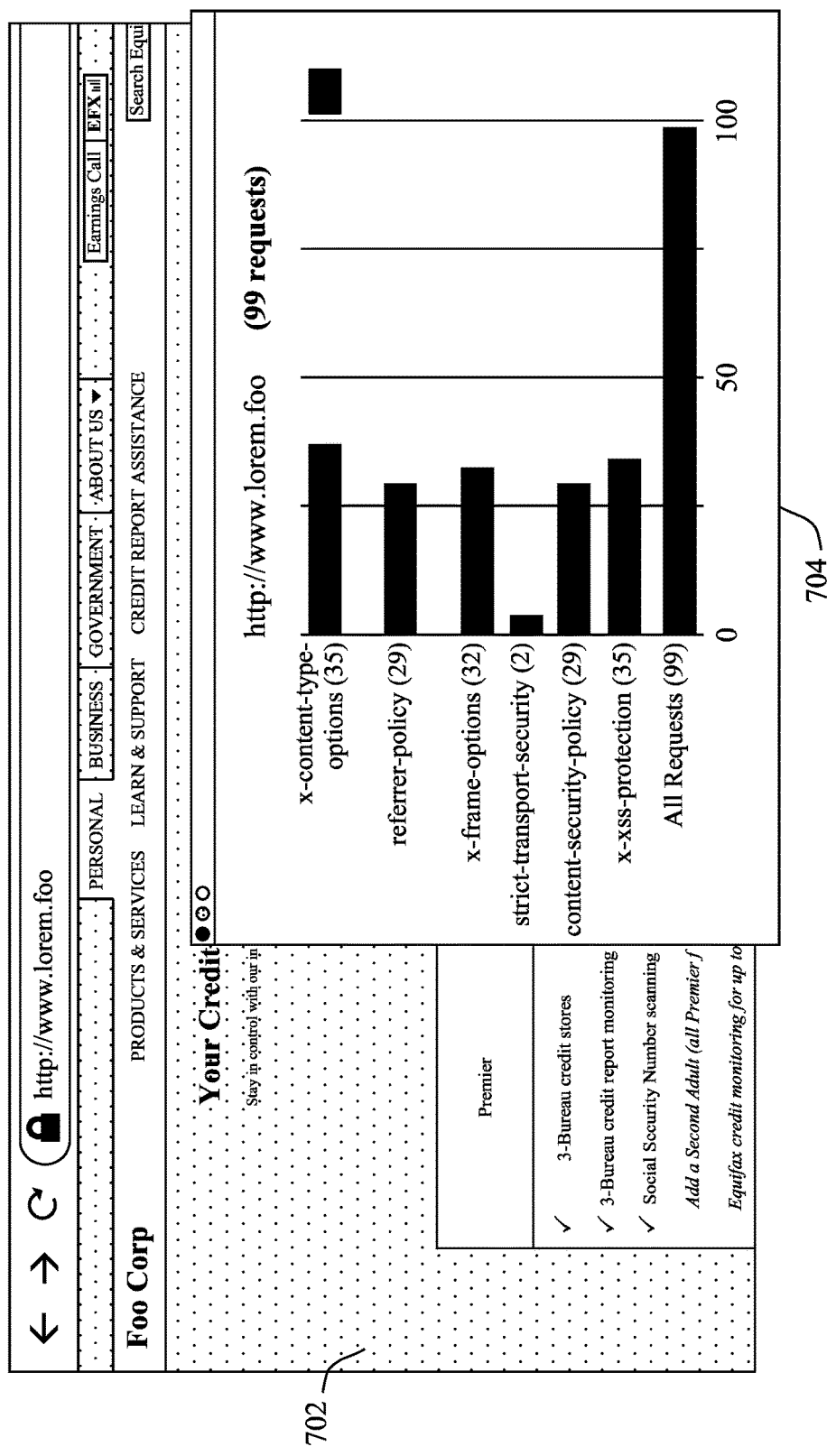

FIG. 7 illustrates a screen capture 700 of a second website 702 tested using the prototype EUSM system and anonymized for purposes of illustration. As shown, the EUSM module generated scoring 704, which indicates that ninety-nine requests were made and that they all make use of the headers specified in the EUSM policy. Consequently, as shown in screen capture 800 in FIG. 8, the EUSM module assigned website 702 an 'Excellent' grade with a very high score of 163.

FIG. 9 illustrates a screen capture 900 of an example configuration menu for the EUSM module. As shown, the configuration menu may include configurable options that allow the user of the client device to enable any or all of the following:

Update Policy—switch or update the EUSM policy;
Show Popup for Security Header Usage—show the scoring popup results after page load;
Send Event to Manager with Security Header Usage—send results after page load to the EUSM server; and
Apply Security Headers from Policy—apply security headers from the EUSM policy.

Figure 10:
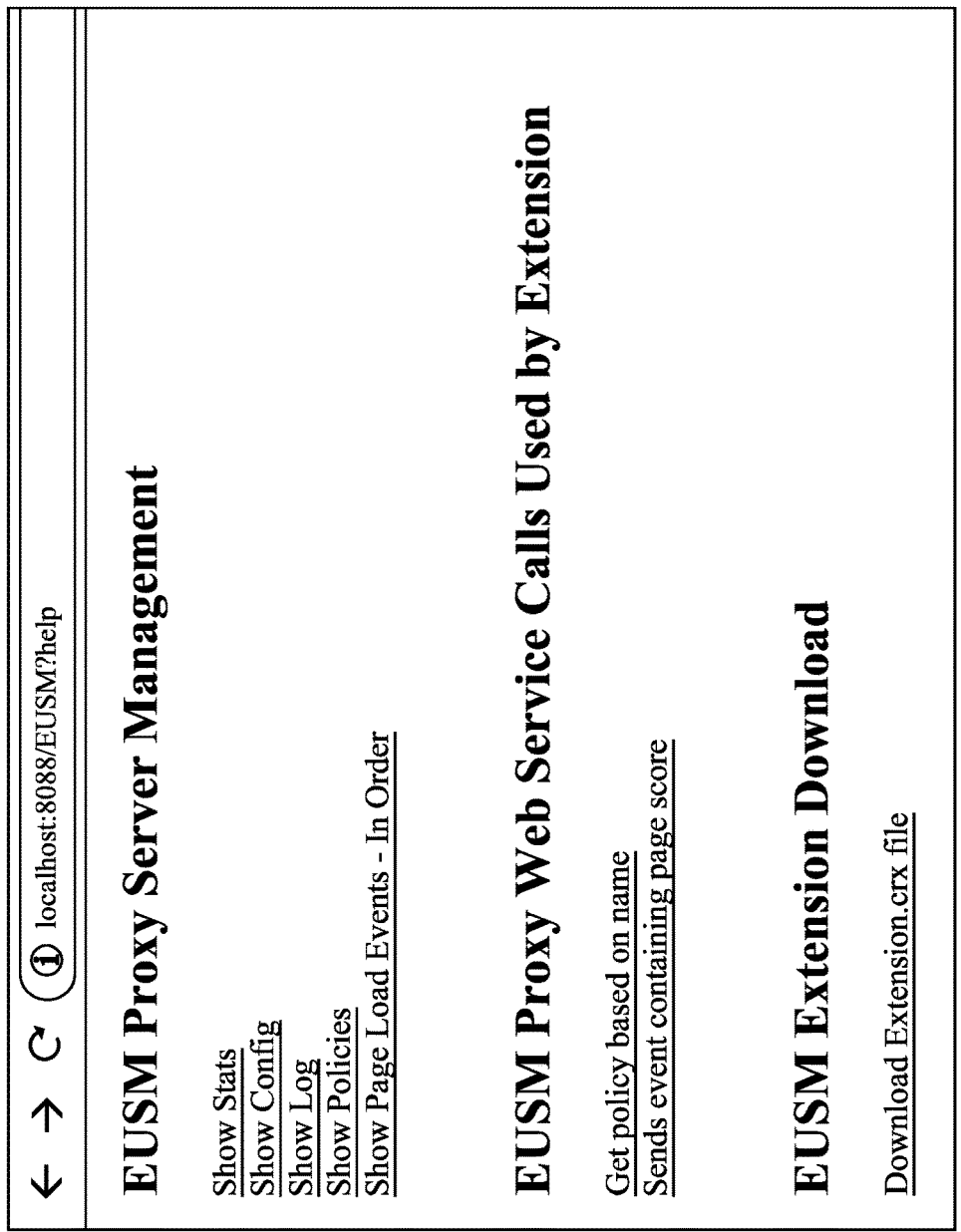
FIG. 10 illustrates an example screen capture of a server management menu for an EUSM system.

FIG. 10 illustrates an example screenshot 1000 for a server management menu. In general, EUSM server management may be based on several management functions that are available for troubleshooting issues and viewing usage, such as show stats, config., log, policies, page load events, and so on.

Figure 11:
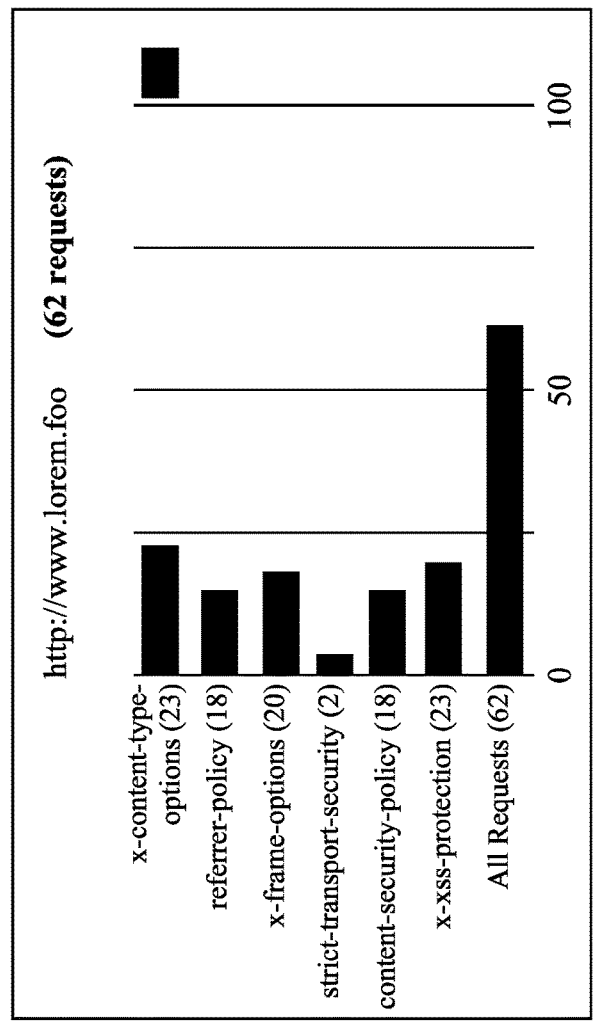
FIG. 11 illustrates an example screen capture of a pop-up window generated by an EUSM system.

Regarding user interfaces, specifically, FIG. 11 shows a screen capture 1100 of an illustrative popup that essentially scores the security headers in the EUSM policy used on a website as a ratio of all requests. Also, FIG. 12 shows a screen capture 1200 of the events panel of the EUSM module. The events panel essentially provides the "security" statistics on the website, as well as an overall summary score. Other interfaces and formats/presentations may be used, and those shown herein are merely examples for illustration.

Figure 13:
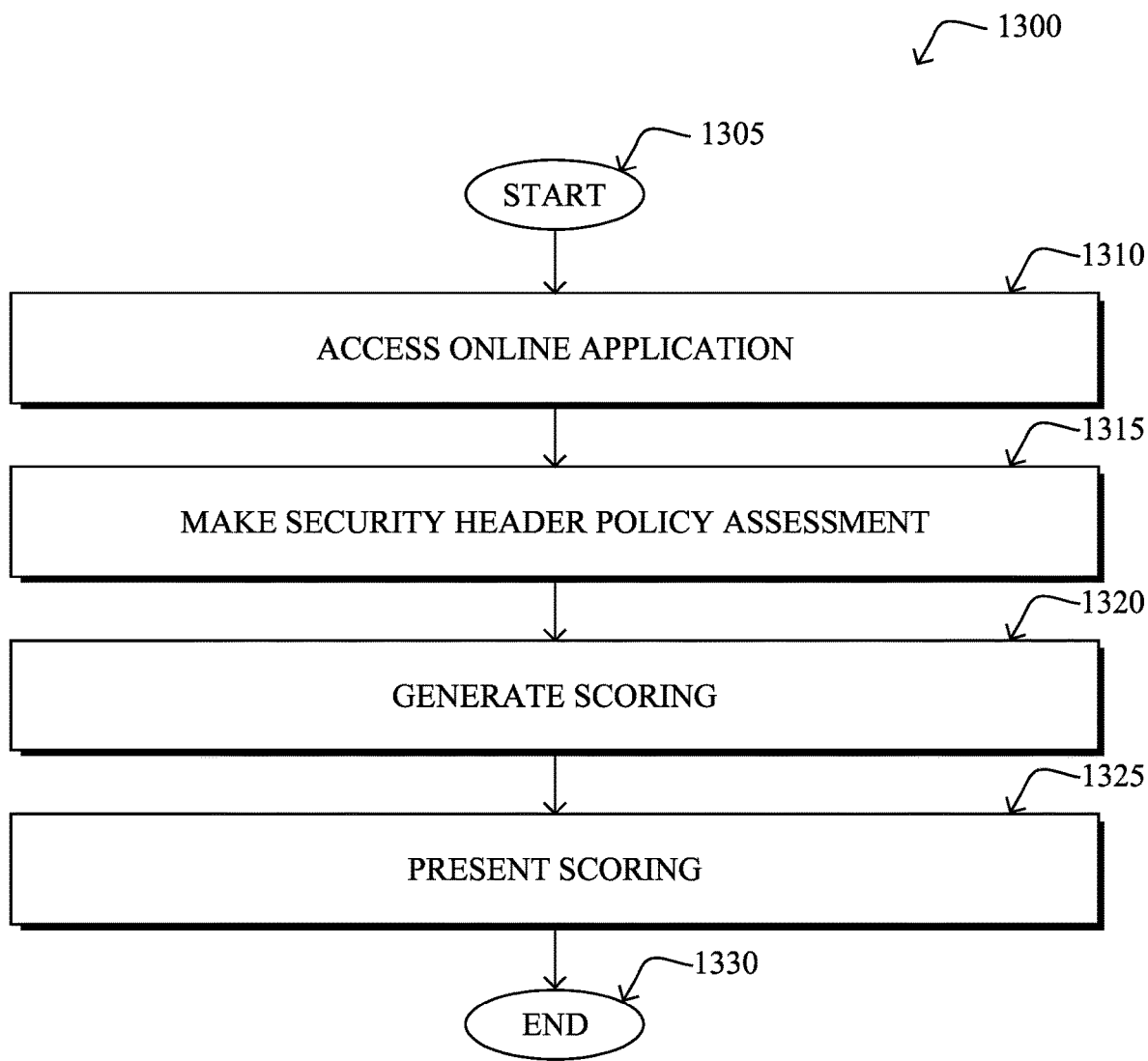
FIG. 13 illustrates an example simplified procedure for managing end user security, in accordance with one or more embodiments described herein.

In closing, FIG. 13 illustrates an example simplified procedure for managing end user security, in accordance with one or more embodiments described herein, in accordance with one or more embodiments described herein, particularly from the perspective of a client device that accesses an online application. For example, a non-generic, specifically configured client device (e.g., device 200) may perform procedure 1300 by executing stored instructions (e.g., process 248). The procedure 1300 may start at step 1305, and continues to step 1310, where, as described in greater detail above, the client device may access an online application via a browser executed by the client device.

At step 1315, as detailed above, the client device may make an assessment as to whether the online application uses HTTP security headers that satisfy a security header policy. In various embodiments, the HTTP security headers specified by the security header policy may comprise one or more of: Content-Security-Policy header, a Referrer-Policy header, a Strict-Transport-Security header, an X-XSS-Protection header, an X-Content-Type-Options header, a CORS header, a Timing-Allow-Origin header, a Link rel=preload header, or a Server-Timing header (notably, there are about many, e.g., thirty or more different security headers, and those listed herein are merely a representative subset). As would be appreciated, the techniques herein can be utilized to ensure that the online application uses any specified HTTP header, in various embodiments. In various embodiments, if the policy assessment indicates that the online application violates the security header policy, the client device may patch the online application with one or more of the HTTP security headers that were specified in the policy, but not used by the online application.

At step 1320, the client device may generate scoring for the online application based on the assessment, as described in greater detail above. In some embodiments, the scoring may take the form of metrics for each of the security headers specified in the security policy used for the assessment in step 1315. For example, such scoring may indicate the number or ratio of uses of a particular header with respect to the total number of requests. In further embodiments, the scoring may also take the form of a more aggregated or global score for the webpage/website/online application, such as "Failed," "Passed," etc. For instance, the client device may assign a failing score to the online application based on at least one of: the online application not using any HTTP security headers on its first page, the application webpage using HTTP as its transfer protocol, the online application not securing a cookie associated with the online application, or use of HTTP security headers by the online application is below a predefined threshold.

At step 1325, as described in greater detail above, the client device may present the generated scoring to a user of the client device. For example, the client device may present the scoring as a pop-up window with the application webpage via the browser, as its own webpage, etc. Procedure 1300 then ends at step 1330.

It should be noted that while certain steps within procedure 1300 may be optional as described above, the steps shown in FIG. 13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an end user security manager. In particular, the techniques herein provide the ability to add secure headers when the secure headers are not already added (i.e., additional security that is controlled by the user when the application/website developer didn't include it). That is, enforcement is at the end user client which has several advantages (e.g., does not rely on the application vendor or on headers added by load balancers or routers). Also, the techniques herein are configured by a policy selected from a server which has several advantages for the user, namely, the user can select the level of security they want, without having to configure the local browser (removing user error), eliminating the need to have domain expertise in terms of understanding the security headers. Also, the user does not have to upgrade a configuration on the local browser or even have knowledge of new security headers—it's automatic through the server. The policy can also be "shared" across a company, department, and/or even a user domain, and policies can be switched and/or configured based on a single browser menu selection. Furthermore, "scoring" of application vendors "compliance" is more precise based on the techniques herein (e.g., based on real users' usage versus test sites, taking into account all components—not just the first page to the web site, and including key coverage for cookie security such as Secure and HttpOnly flags).

According to the embodiments herein, a method herein may comprise: accessing, by a client device, an online application via a network. The method also comprises making, by the client device, an assessment as to whether the online application uses Hypertext Transfer Protocol (HTTP) security headers that satisfy a security header policy. The method further comprises generating, by the client device, scoring for the online application based on the assessment. The method also comprises presenting, by the client device, the generated scoring to a user of the client device.

In one embodiment, the HTTP security headers comprise one or more of: Content-Security-Policy header, a Referrer-Policy header, a Strict-Transport-Security header, an X-XSS-Protection header, an X-Content-Type-Options header, a CORS header, a Timing-Allow-Origin header, a Link rel=preload header, or a Server-Timing header, among others. In another embodiment, the method may further comprise downloading, by the client device, a browser extension for the browser, wherein the browser extension performs the making, generating, and presenting steps. In a further embodiment, the generating step of the method comprises assigning a failing score to the online application based on at least one of: the online application not using any HTTP security headers on its first page, the online application using HTTP as its transfer protocol, the online application not securing a cookie associated with the online application, or use of HTTP security headers by the online application is below a predefined threshold. In yet another embodiment, the method further comprises patching the online application with one or more of the HTTP security headers, based on the assessment indicating that the online application violates the security header policy. In another embodiment, the generated scoring is presented as a pop-up window with the online application. In a further embodiment, the method further comprises providing, by the client device, an indication of the online application to a remote service, and downloading, by the client device, the security header policy from the remote service. In another embodiment, the method additional comprises receiving, at the client device, an update to the security header policy via a user interface of the client device, and sending, by the client device and to the remote service, the update to the security header policy. In another embodiment, the method further comprises deactivating, via the browser executed by the client device, enforcement of the security header policy.

According to the embodiments herein, an apparatus comprises one or more network interfaces, a processor coupled to the one or more network interfaces and configured to execute one or more processes, and a memory configured to store a process executable by the processor. When executed, the process is configured to access an online application via a browser executed by the apparatus, make an assessment as to whether the online application uses Hypertext Transfer Protocol (HTTP) security headers that satisfy a security header policy, generate scoring for the webpage based on the assessment, and present the generated scoring to a user of the apparatus.

According to further embodiments herein, a tangible, non-transitory, computer-readable medium stores program instructions that cause a client device to execute a process. The process comprises accessing, by the client device, an online application via a browser executed by the client device, making, by the client device, an assessment as to whether the online application uses Hypertext Transfer Protocol (HTTP) security headers that satisfy a security header policy, generating, by the client device, scoring for the webpage based on the assessment, and presenting, by the client device, the generated scoring to a user of the client device.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
accessing, by a client device, an online application via a browser executed by the client device;
making, by the client device, an assessment as to whether the online application uses Hypertext Transfer Protocol (HTTP) security headers that satisfy a security header policy that requires a plurality of HTTP security headers to be used for the online application;
generating, by the client device, scoring for the online application based on the assessment, the scoring comprising metrics for each of the plurality of HTTP security headers specified in the security header policy; and
presenting, by the client device, the generated scoring to a user of the client device.

2. The method as in claim 1, wherein the HTTP security headers comprise one or more of: Content-Security-Policy header, a Referrer-Policy header, a Strict-Transport-Security header, an X-XSS-Protection header, an X-Content-Type-Options header, a CORS header, a Timing-Allow-Origin header, a Link rel=preload header, or a Server-Timing header.

3. The method as in claim 1, further comprising:
downloading, by the client device, a browser extension for the browser, wherein the browser extension performs the making, generating, and presenting steps.

4. The method as in claim 1, wherein generating scoring for the online application based on the assessment comprises:
assigning a failing score to the online application based on at least one of: the online application not using any HTTP security headers on its first page, the online application using HTTP as its transfer protocol, the online application not securing a cookie associated with the online application, or use of HTTP security headers by the online application is below a predefined threshold.

5. The method as in claim 1, further comprising:
patching the online application with one or more of the HTTP security headers, based on the assessment indicating that the online application violates the security header policy.

6. The method as in claim 1, wherein the generated scoring is presented as a pop-up window with the online application.

7. The method as in claim 1, further comprising:
providing, by the client device, an indication of the online application to a remote service; and
downloading, by the client device, the security header policy from the remote service.

8. The method as in claim 7, further comprising:
receiving, at the client device, an update to the security header policy via a user interface of the client device; and
sending, by the client device and to the remote service, the update to the security header policy.

9. The method as in claim 1, further comprising:
deactivating, via the browser executed by the client device, enforcement of the security header policy.

10. An apparatus, comprising:
one or more network interfaces;
a processor coupled to the one or more network interfaces and configured to execute one or more processes; and
a memory configured to store a process executable by the processor, the process when executed configured to:
access an online application via a browser executed by the apparatus;
make an assessment as to whether the online application uses Hypertext Transfer Protocol (HTTP) security headers that satisfy a security header policy that requires a plurality of HTTP security headers to be used for the online application;
generate scoring for the online application based on the assessment, the scoring comprising metrics for each of the plurality of HTTP security headers specified in the security header policy; and
present the generated scoring to a user of the apparatus.

11. The apparatus as in claim 10, wherein the HTTP security headers comprise one or more of: Content-Security-Policy header, a Referrer-Policy header, a Strict-Transport-Security header, an X-XSS-Protection header, an X-Content-Type-Options header, a CORS header, a Timing-Allow-Origin header, a Link rel=preload header, or a Server-Timing header.

12. The apparatus as in claim 10, wherein the process when executed is further configured to:
download a browser extension for the browser, wherein the browser extension makes the assessment, generates the scoring, and presents the generated scoring.

13. The apparatus as in claim 10, wherein the apparatus generates the scoring for the online application based on the assessment by:
assigning a failing score to the online application based on at least one of: the online application not using any HTTP security headers on its first page, the online application using HTTP as its transfer protocol, the online application not securing a cookie associated with the online application, or use of HTTP security headers by the online application is below a predefined threshold.

14. The apparatus as in claim 10, wherein the process when executed is further configured to:
patch the online application with one or more of the HTTP security headers, based on the assessment indicating that the online application violates the security header policy.

15. The apparatus as in claim 10, wherein the generated scoring is presented as a pop-up window with the online application.

16. The apparatus as in claim 10, wherein the process when executed is further configured to:
provide an indication of the online application to a remote service; and
download the security header policy from the remote service.

17. The apparatus as in claim 16, wherein the process when executed is further configured to:
receive an update to the security header policy via a user interface associated with the apparatus; and
send, to the remote service, the update to the security header policy.

18. The apparatus as in claim 10, wherein the process when executed is further configured to:
deactivate, via the browser, enforcement of the security header policy.

19. A tangible, non-transitory, computer-readable medium storing program instructions that cause a client device to execute a process comprising:
accessing, by the client device, an online application via a browser executed by the client device;
making, by the client device, an assessment as to whether the online application uses Hypertext Transfer Protocol (HTTP) security headers that satisfy a security header policy that requires a plurality of HTTP security headers to be used for the online application;

generating, by the client device, scoring for the online application based on the assessment, the scoring comprising metrics for each of the plurality of HTTP security headers specified in the security header policy; and presenting, by the client device, the generated scoring to a user of the client device.

20. The computer-readable medium as in claim 19, wherein the HTTP security headers comprise one or more of: Content-Security-Policy header, a Referrer-Policy header, a Strict-Transport-Security header, an X-XSS-Protection header, an X-Content-Type-Options header, a CORS header, a Timing-Allow-Origin header, a Link rel=preload header, or a Server-Timing header.

* * * * *